United States Patent
Piotrowski

(10) Patent No.: US 11,522,328 B2
(45) Date of Patent: Dec. 6, 2022

(54) PLUG-IN CONNECTION SOCKET AND PASSENGER SERVICE MODULE

(71) Applicant: Lufthansa Technik AG, Hamburg (DE)

(72) Inventor: Pawel Piotrowski, Berlin (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/273,737

(22) PCT Filed: Sep. 3, 2019

(86) PCT No.: PCT/EP2019/073440
§ 371 (c)(1),
(2) Date: Mar. 5, 2021

(87) PCT Pub. No.: WO2020/048961
PCT Pub. Date: Mar. 12, 2020

(65) Prior Publication Data
US 2021/0194194 A1    Jun. 24, 2021

(30) Foreign Application Priority Data

Sep. 5, 2018   (DE) .................. 10 2018 121 680.7

(51) Int. Cl.
*H01R 35/04*    (2006.01)
*B60R 16/027*   (2006.01)

(52) U.S. Cl.
CPC ........... *H01R 35/04* (2013.01); *B60R 16/027* (2013.01); *H01R 2201/26* (2013.01)

(58) Field of Classification Search
CPC ..................... H01R 35/04; H01R 2201/26
USPC ......................................................... 439/131
See application file for complete search history.

(56) References Cited

U.S. PATENT DOCUMENTS

| | | | |
|---|---|---|---|
| 1,635,686 A * | 7/1927 | Morrison ............. | H01R 33/955 200/51.13 |
| 6,695,620 B1 * | 2/2004 | Huang ................. | H01R 13/562 439/11 |
| 7,234,963 B1 * | 6/2007 | Huang .................. | H01R 35/00 439/446 |
| 8,157,569 B1 * | 4/2012 | Liu ........................ | H01R 35/04 439/11 |
| 9,490,664 B2 * | 11/2016 | Lo .......................... | H01R 24/78 |
| 9,893,453 B2 * | 2/2018 | Cox ....................... | H01R 39/12 |
| 10,063,021 B1 * | 8/2018 | Lipke ................... | H01R 13/719 |

(Continued)

FOREIGN PATENT DOCUMENTS

| | | |
|---|---|---|
| DE | 2623145 A1 | 12/1977 |
| DE | 19547879 A1 | 6/1997 |

(Continued)

*Primary Examiner* — Alexander Gilman
(74) *Attorney, Agent, or Firm* — Leydig, Voit & Mayer, Ltd.

(57) ABSTRACT

A plug-in connection box for vehicles has a socket and a return apparatus. The socket, is accessible from an access side and has an insertion direction. The socket is arranged in a pivot body, which is mounted in a movable manner in relation to a receptacle in such a way that the insertion direction of the socket is pivotable at an angle in all directions starting from a stationary state of the pivot body. The return apparatus is configured to return the pivot body to the stationary state.

9 Claims, 3 Drawing Sheets

(56) References Cited

U.S. PATENT DOCUMENTS

| | | | | |
|---|---|---|---|---|
| 10,326,236 | B1* | 6/2019 | Harmelink | H01R 13/6273 |
| 10,406,696 | B2* | 9/2019 | Grachanen | B25J 9/1075 |
| 10,507,575 | B2* | 12/2019 | Park | B25J 19/0004 |
| 10,594,093 | B2* | 3/2020 | Lipke | H01R 13/567 |
| 2004/0229478 | A1* | 11/2004 | Chen | H01R 35/04 |
| | | | | 439/11 |
| 2012/0028505 | A1* | 2/2012 | Weber | H01R 35/04 |
| | | | | 439/638 |
| 2013/0115792 | A1* | 5/2013 | Lee | H01R 35/04 |
| | | | | 439/131 |
| 2014/0127937 | A1* | 5/2014 | Huang | H01R 35/04 |
| | | | | 439/534 |
| 2014/0265476 | A1* | 9/2014 | Schneider | B64D 11/0626 |
| | | | | 297/217.1 |
| 2015/0093917 | A1* | 4/2015 | Stern | H01R 35/04 |
| | | | | 439/8 |
| 2017/0214203 | A1* | 7/2017 | Cox | H01R 35/04 |
| 2018/0192948 | A1* | 7/2018 | Okumura | H05K 3/22 |
| 2018/0338544 | A1* | 11/2018 | Huang | H05K 1/0283 |
| 2020/0022414 | A1* | 1/2020 | Leeds | H02J 7/0042 |
| 2021/0120651 | A1* | 4/2021 | Jiang | H05B 47/19 |
| 2021/0194194 | A1* | 6/2021 | Piotrowski | H01R 35/04 |
| 2022/0077640 | A1* | 3/2022 | Frei | H01R 27/00 |
| 2022/0126684 | A1* | 4/2022 | Schurz | B62D 25/24 |

FOREIGN PATENT DOCUMENTS

| | | | |
|---|---|---|---|
| DE | 102007002307 A1 | 7/2008 | |
| DE | 102010062837 B3 | 5/2012 | |
| DE | 102013205191 A1 | 10/2013 | |
| EP | 2778064 A1 * | 9/2014 | B60R 99/00 |

* cited by examiner

PLUG-IN CONNECTION SOCKET AND PASSENGER SERVICE MODULE

CROSS-REFERENCE TO PRIOR APPLICATIONS

This application is a U.S. National Phase Application under 35 U.S.C. § 371 of International Application No. PCT/EP2019/073440, filed on Sep. 3, 2019, and claims benefit to German Patent Application No. DE 10 2018 121 680.7, filed on Sep. 5, 2018. The International Application was published in German on Mar. 12, 2020 as WO 2020/048961 under PCT Article 21(2).

FIELD

The present invention relates to a plug-in connection box for vehicles, in particular aircraft, and to a passenger service module comprising a corresponding plug-in connection box.

BACKGROUND

In vehicles, in particular for public transportation, passengers are generally provided with power and/or data connections to which they can connect their personal electronic devices in order to charge the energy stores thereof or to obtain data. In this case, the connection is made using cables which are generally provided with standardized plugs, for example USB plugs.

Corresponding power and/or data connections have to be configured to be robust enough that it is possible to withstand any so-called misuse-induced loads, which may occur due to an inserted cable being pulled, in particular in a direction which does not lead directly to the plug being pulled out of the connection. The structure to which a power and/or data connection in the vehicle is fastened also has to be able to withstand corresponding loads.

When vehicles are retrofitted with power and/or data connections, it is not always ensured that a structure which is strong enough to fasten the connections to it is available. This applies, for example, to passenger aircraft. In the region of the passenger seats in the cabin, the structure, which is conceivable in principle for receiving power and/or data connections, such as the wall panels or the region of the reading lamps above the seats, is generally not strong enough to be able to withstand said misuse-induced loads, and for this reason retrofitting of power and/or data connections in these regions is generally not possible.

Particularly when connections are arranged in the region of the reading lamps above the seats, the problem further arises of cables inserted there possibly impeding any potential evacuation. For example, in particular, passengers in window seats of conventional seat arrangements in an aircraft may be impeded by cables inserted into corresponding connections when leaving their seat.

SUMMARY

In an embodiment, the present invention provides a plug-in connection box for vehicles that has a socket and a return apparatus. The socket, is accessible from an access side and has an insertion direction. The socket is arranged in a pivot body, which is mounted in a movable manner in relation to a receptacle in such a way that the insertion direction of the socket is pivotable at an angle in all directions starting from a stationary state of the pivot body. The return apparatus is configured to return the pivot body to the stationary state.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1A:
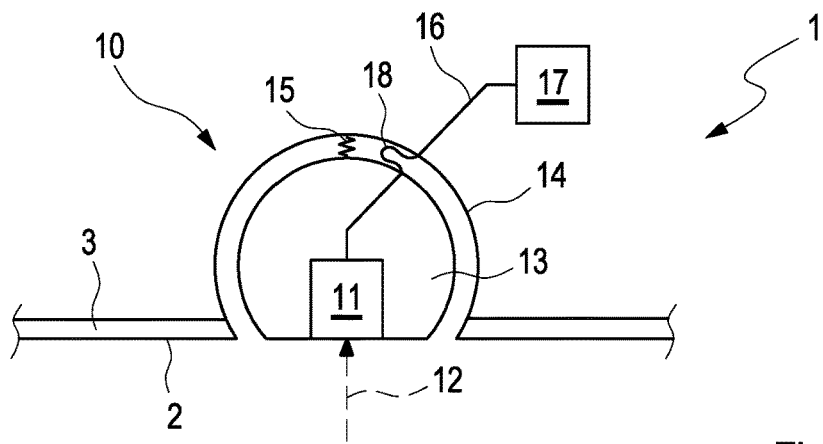
FIGS. 1a-d show a schematic illustration of a first exemplary embodiment of a passenger service module according to the invention having a plug-in connection box according to the invention.

In an embodiment, the present invention provides a plug-in connection box for vehicles, in which the disadvantages known from the prior art no longer occur or occur only to a reduced extent.

Embodiments of the present invention relate to a plug-in connection box for vehicles, comprising a socket which is accessible from an access side and has an insertion direction, wherein the socket is arranged in a pivot body which is mounted in a movable manner in relation to a receptacle in such a way that the insertion direction of the socket of the pivot body can be pivoted at an angle in all directions starting from a stationary state of the pivot body, and wherein a return apparatus for returning the pivot body to the stationary state is provided.

Embodiments of the present invention further relate to a passenger service module for arrangement in the interior of vehicles, comprising a panel which forms the access side and has at least one plug-in connection box according to the invention incorporated therein.

Embodiments of the present invention have recognized that the requirements, in respect of the strength of the structure on which a plug-in connection box is intended to be arranged, can be considerably reduced if misuse-induced loads, which may be introduced by inserted cables, are limited to a maximum by suitable configuration of the plug-in connection box. In the plug-in connection box according to an embodiment of the invention, this is achieved by way of the actual socket being arranged in a pivot body which, when a misuse-induced load occurs, pivots such that the insertion direction of the socket points fundamentally in the direction of the misuse-induced load, so that the plug is pulled out of the socket in the event of an excessive misuse-induced load. This reduces the maximum load to be absorbed by the structure owing to misuse-induced loads applied via an inserted plug to that load in the case of which the plug is pulled out of the socket. In comparison to stationary sockets in which the plug is pulled in a certain cone around the insertion direction only in the event of misuse-induced loads, the opening angle of the cone, in which misuse-induced loads lead to the plug being pulled out, can generally be around 60° to 90° in the case of a plug-in connection box according to the invention on account of its pivotability, which can be +30° to 45° for example. In simple terms, the pivotability provided according to the invention has the effect that, in the case of any misuse-induced loads, the plug is pulled out of the socket rather than excessive loads being transmitted to the structure to which the plug-in connection box is fastened. In the case of evacuation, cables inserted into the socket likewise simply become detached, so that they practically do not impede evacuation.

The pivotability of the plug-in connection box can be achieved by a pivot body, which is arranged in a receptacle, wherein the pivot body and the receptacle have, for example spherical or spherical-segment-like, sliding surfaces which are matched to one another. The pivot body can therefore be pivoted in relation to the receptacle in a sliding manner. As an alternative, it is possible to cardanically mount the pivot body in relation to the receptacle. Corresponding cardanic suspension likewise allows the pivotability provided according to the invention.

The pivotability is, in a preferred embodiment, limited by a stop, wherein the stop limits the pivotability, preferably uniformly, in all directions starting from the stationary state. The pivotability can be restricted, for example, to an angle of at most 45°, further preferably of at most 35°. By virtue of corresponding limiting, any supply lines from the receptacle to the pivot body can be protected against excessive strain and damage.

In order to nevertheless ensure simple insertion of plugs into the plug-in connection box, a return apparatus is provided according to embodiments of the invention, which return apparatus moves the pivot body with the socket, in principle, to a stationary state, by way of which the insertion direction in the unloaded state is also unambiguously defined.

In order to further reduce the loads possibly transmitted to the structure in the case of misuse-induced loads, a release device for releasing a plug which is inserted into the socket when the pivot body is in the non-stationary state can be provided on the pivot body. A corresponding release device can have the effect that a plug is already released from the socket on account of the pivot body pivoting out of the stationary state and an adequately high force does not further additionally have to act on the plug in the insertion direction of the socket for this purpose. Particularly in the case of misuse-induced forces which act transversely to the insertion direction in the stationary state, quicker release can be achieved in this way, as a result of which the forces to be transmitted to the structure can be further reduced.

The release device, in a preferred embodiment, comprises a pin which extends from the socket as far as the receptacle parallel to the insertion direction, wherein the receptacle is designed in such a way that the pin which slides along it is displaced in the direction of the socket when the pivot body is not in the stationary state, in order to thereby release a plug which is inserted into the socket, specifically by way of the plug being pushed out of the socket by the pin. The receptacle can have, for example, a sliding surface in the shape of an ellipsoid of revolution for the pin, the axis of rotational symmetry thereof coinciding with the axis of the pin in the stationary state. In the stationary state, the pin then bears against the apex of the sliding surface in the shape of an ellipsoid of revolution and is displaced in the direction of the socket in the case of any angular deflection of the pivot body. The pin can be prestressed in the direction of the receptacle by a spring.

In a preferred embodiment, the pivot body is mounted such that it can rotate about the insertion direction. In this way, it is possible to ensure that torques acting about the insertion direction do not result in any loads on the structure on which the plug-in connection box is arranged. The rotatability of the pivot body can be limited by a stop or the like in order to protect any supply lines from the receptacle to the pivot body against excessive strain and damage.

The return apparatus can comprise springs and/or magnets. In this case, the springs can run between the receptacle and the pivot body. In the case of a refinement with magnets, one magnet can be arranged on the receptacle and another magnet can be arranged on the pivot body, the poles of said magnets being oriented in relation to one another in such a way that, on account of the magnetic attraction, the pivot body is pulled to the stationary state. In addition to a metal spring as part of the return apparatus, plastic springs or shaped plastic parts with an integrated spring element can also be used in particular.

The plug-in connection box can comprise a control lamp for indicating correct plug-in connection of a plug in the socket. In this case, the control lamp can be arranged in the pivot body and/or in the panel. A corresponding control lamp can be used to indicate to a user whether the plug which they have inserted into the socket is correctly inserted. The control lamp can be driven, for example, on the basis of a current flow across the socket being established.

The control lamp can also be formed by one end of a light guide, wherein the light source is arranged at the other end of the light guide. In this case, the light source can be arranged, for example, directly on an electronics module which is embodied separately from the actual plug-in connection box. The plug-in connection box and, in particular, its pivot body can be kept free of active electronics components in this way, as a result of which simpler replaceability is achieved.

In a preferred embodiment, the socket is a USB socket. Corresponding sockets are particularly suitable for data and/or power connection to personal electronic devices.

Reference is made to the above statements in order to explain the passenger service module according to the invention. If, as outlined, the loads acting on the underlying structure—in this case the passenger service module—is limited by the plug-in connection box according to the invention, those of the passenger service module on that structure to which, in turn, the passenger service module is fastened is accordingly limited.

The passenger service module can be of modular construction. In particular said passenger service module can comprise, in addition to the panel with at least one incorporated plug-in connection box, an electronics module which is embodied separately from said panel and is connected to the socket of the at least one plug-in connection box via a detachable cable connection. Owing to this separation into modules, it is easy to replace the individual modules. If, for example, a plug-in connection box is mechanically damaged, only the corresponding module has to be replaced, while the electronics module can be retained. The electronics module can also be replaced separately from the module with the at least one plug-in connection box in order to be able to provide, for example, new or other functions.

In a preferred embodiment, a number of plug-in connection boxes, which corresponds to the number of passenger spaces associated with the passenger service module, are provided. For example, in passenger aircraft in which the passenger service module can be arranged next to the reading lamps above the rows of seats, a number of (usually three) plug-in connection boxes which is sufficient for in each case one row of seats can be provided. In this case, the passenger service module can be configured in a manner comparable to the known reading lamp module, wherein—as already outlined—the possibly additional electronics can be embodied as a separate module.

FIGS. 1a-d show a schematic section through a passenger service module 1 according to an embodiment of the invention. The passenger service module 1 comprises a panel 3, which forms the eventual access side 2 and by way of which the passenger service module 1 can also be fastened to the structure, for example in the region of the reading lamps in the passenger cabin of an aircraft.

A plug-in connection box 10 according to the invention, which serves for power supply, is incorporated into the panel 3.

The plug-in connection box 10 has a socket 11, which is accessible from the access side 2 and has an insertion direction 12. The socket 11 is embodied as a USB socket, so that passengers can charge their personal electronic devices, such as mobile telephones for example, via the USB socket 11 via cables which are provided with a USB plug. Data transmission via the USB socket 11 is also possible.

The socket 11 is arranged in a pivot body 13, which is pivotably mounted in a receptacle 14 in such a way that the socket 11 or its insertion direction 12 can be pivoted at an angle. For this purpose, the pivot body 13 and the receptacle 14 are configured in a substantially spherical manner, wherein the pivot body 13 is mounted in the receptacle 14 in a sliding manner. The gap between the pivot body 13 and the receptacle 14 in FIG. 1 and the following figures serves merely for illustration purposes. The surfaces which delimit the gap actually lie against one another in a sliding manner.

A spring 15 is provided between the pivot body 13 and the receptacle 14 as a return apparatus, which moves the pivot body 13, in principle, to the stationary state shown in FIG. 1a or holds it in this state. At the same time, the spring 15, by its maximum extent, limits the deflection of the pivot body 13 in relation to the receptacle 14 to approximately 35° (cf. FIG. 1c).

The socket 11 is connected, via a detachable cable connection 16, to an electronics module 17, which is formed separately from the panel 3 and the plug-in connection box 10 and provides the electrical power to the superordinate on-board electrical system with the required voltage. The cable connection 16 is laid in a loop 18 at the transition between the pivot body 13 and the receptacle 14, so that the cable connection 16 does not impede the pivoting movement of the pivot body 13.

The manner of operation of the plug-in connection box 10 will now be explained in more detail with reference to FIGS. 1b-d.

Figure 1B:
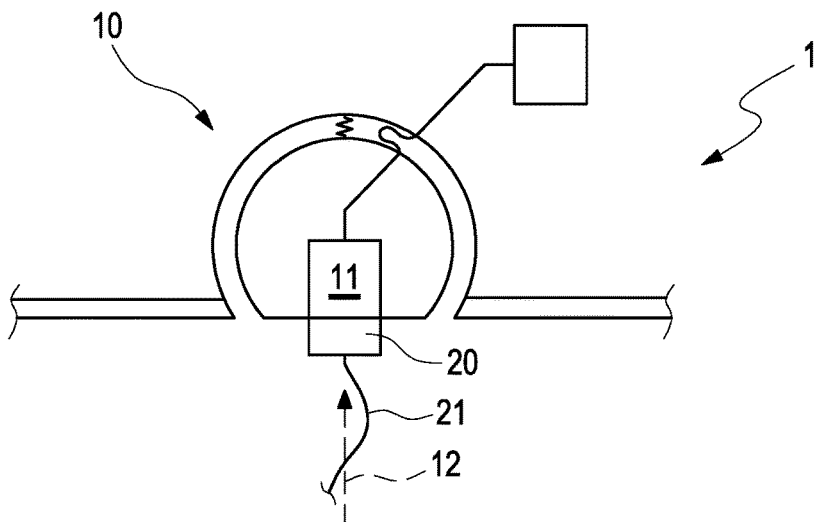
Figure 1C:
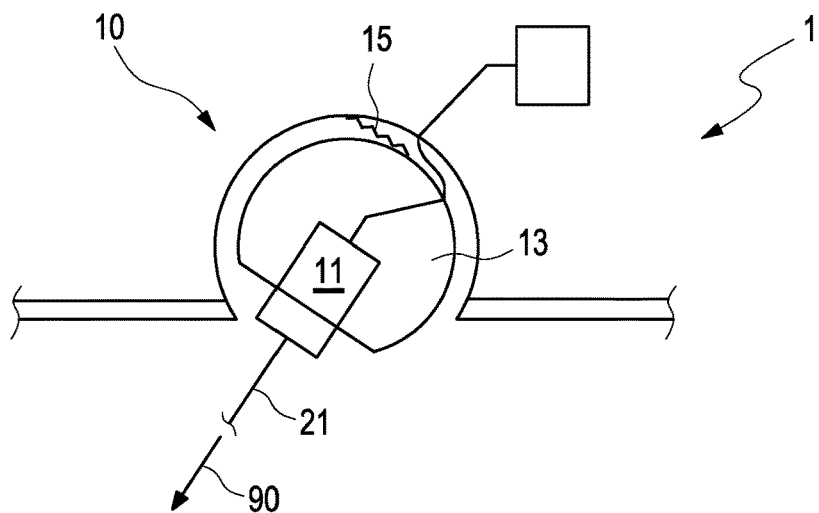
Figure 1:
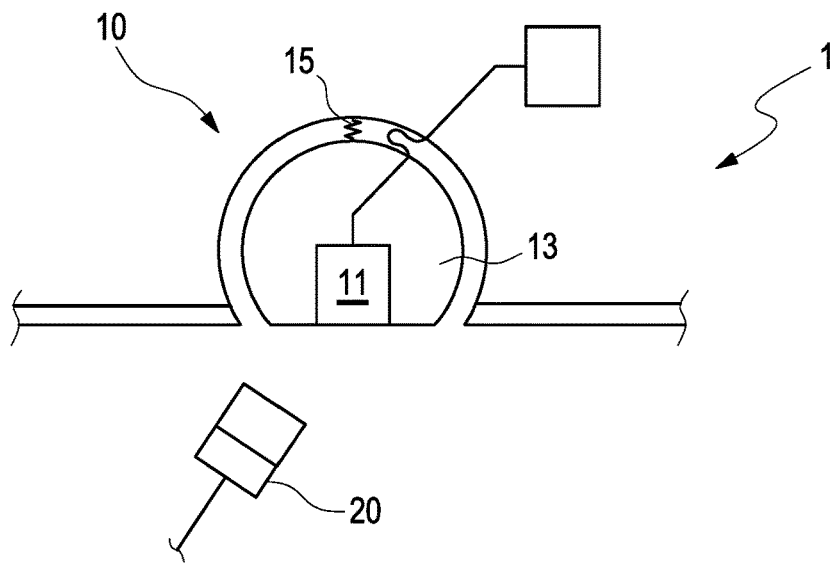

Since the pivot body 13 and therefore also the socket 11 are in the initial state illustrated in FIG. 1a on account of the spring 15 in the stationary state, the insertion direction 12 of the socket 11 is also in a position which is favorable for insertion of a cable plug 20 (FIG. 1b).

Figure 2:
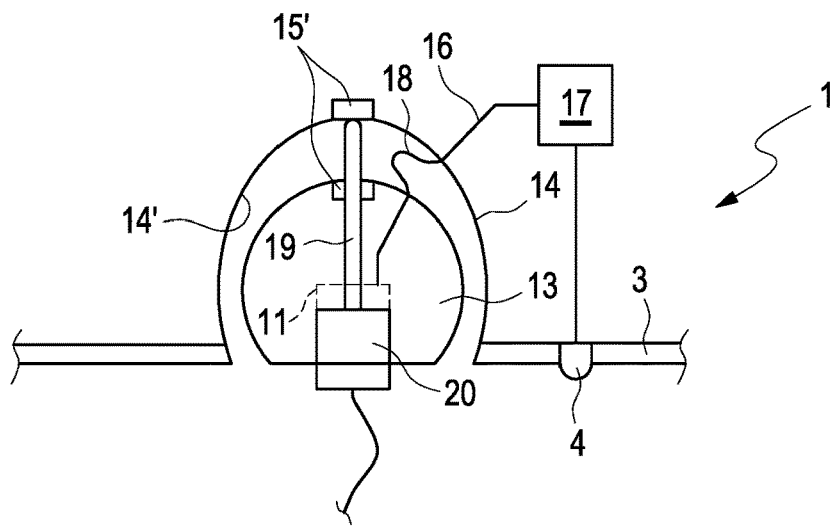
FIGS. 2a, b show a schematic illustration of a second exemplary embodiment of a passenger service module according to the invention having a plug-in connection box according to the invention.
Figure 2:
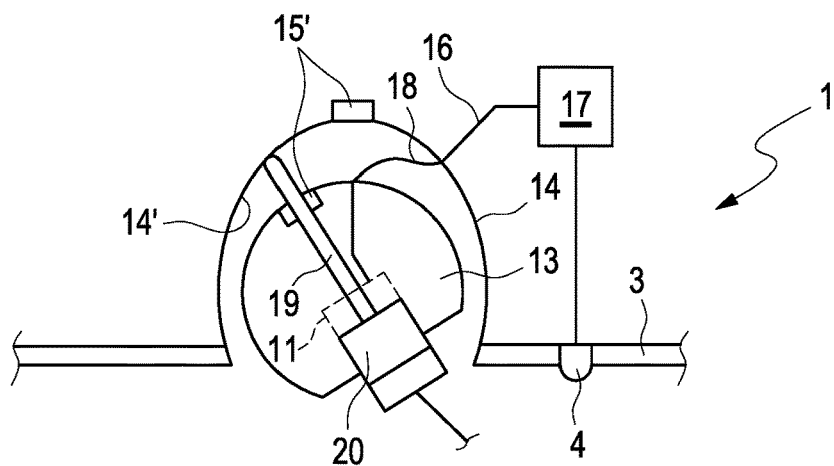

If the cable 21 of the cable plug 20 is now pulled in the direction indicated by the arrow 90 in FIG. 2c, the pivot body 13 and therefore also the socket 11 are oriented in accordance with this misuse-induced load, wherein the spring 15 is also tensioned, amongst other things.

If the misuse-induced load exceeds the release force of the socket 11, the cable plug 20 is pulled out of the socket 11 and the pivot body 13 quickly returns to the stationary state again on account of the spring 15 (cf. FIG. 1d).

In the design variant according to FIGS. 1a-d, the loads transmitted from the receptacle 11 to the panel 3 or the surrounding structure are limited by the release force of the socket 11. By way of the socket 11 being oriented, in principle, in the direction of the misuse-induced load that occurs, there is, in particular, no risk of an excessive misuse-induced load being introduced into the socket 11 without exceeding the release force.

FIGS. 2a, b illustrate a second exemplary embodiment of a passenger service module 1 according to the invention having a plug-in connection box 10. Due to the existing similarities to the design from FIGS. 1a-d, only the differences from this embodiment will be discussed below.

The receptacle 14 of the plug-in connection box 10 incorporated into a panel 3 has a sliding surface 14' in the shape of an ellipsoid of revolution on which a pin 19 which is guided in the pivot body 13 and protrudes as far as the socket 11 slides. In the stationary state of the pivot body 14, the pin 19 is situated at the apex of the sliding surface 14' in the shape of an ellipsoid of revolution and as a result is retracted out of the socket 11 to such an extent that a cable plug 20 can be inserted there without problems (FIG. 2a). As soon as the pivot body 13 is laid out, the pin 19 slides on the sliding surface 14' in the shape of an ellipsoid of revolution and is displaced relative to the socket 11 in such a way that the cable plug 20 which is inserted into the socket 11 is pushed out of the socket 11 and therefore released when the pivot body 13 is pivoted, even if the force resulting from a misuse-induced load in the insertion direction (after possible pivoting) possibly does not exceed the actual release force of the socket 11.

In the exemplary embodiment according to FIGS. 2a, b, the return apparatus is formed by two magnets 15', one of which is provided on the receptacle 14 and the other of which is provided in the form of a ring around the pin 19 on the pivot body 13. In this case, the magnets 15' are oriented such that they attract each other, as a result of which the position of the pivot body 13 illustrated in FIG. 2a forms the stable state.

The pivot body 13 is rotatable about the insertion axis 12. For this purpose, the loop 18 of the cable connection 16 is selected to be long enough that this rotational movement is not impeded or impeded only as little as possible even when the pivot body 13 is deflected.

A light-emitting diode is provided in the panel 3 as the control lamp 4 which is associated with the plug-in connection box 10 and is connected to the electronics module 17 via a detachable cable connection. The control lamp 4 can be used to indicate whether an electronic device that is connected via the socket 11 is being charged and/or whether there is a data connection. Therefore, the control lamp 4 can be used to easily identify whether the cable plug 20 has possibly undesirably become detached. Accordingly, the control lamp 4 would light up in FIG. 2a, but not in FIG. 2b.

Figure 3:
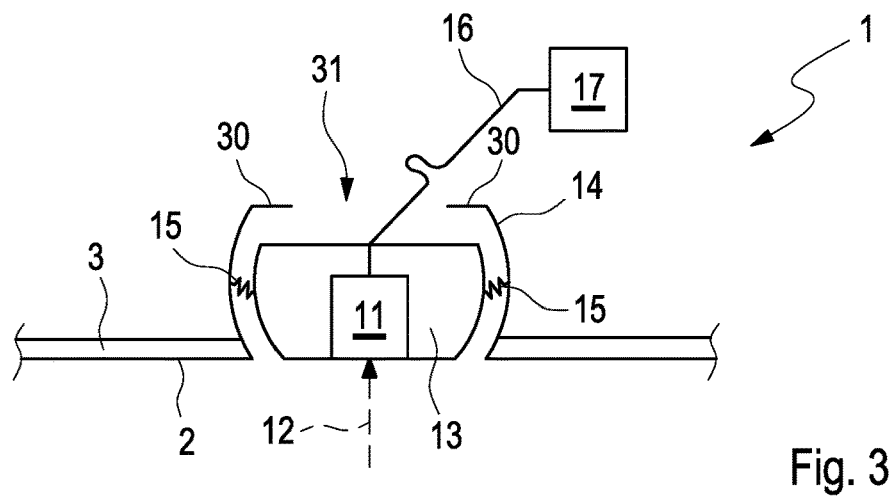
FIG. 3 shows a schematic illustration of a third exemplary embodiment of a passenger service module according to the invention having a plug-in connection box according to the invention.

FIG. 3 illustrates a further exemplary embodiment of a passenger service module 1 according to the invention having a plug-in connection box 10, which passenger service module 1 is based on the first exemplary embodiment according to FIGS. 1a-d, and for this reason only the differences will be discussed below.

The pivot body 13 and the receptacle 14 each have only one spherical-segment-like sliding surface, these sliding surfaces allowing pivoting of the pivot body 13 in relation to the receptacle 14 in principle. At the end that is averted from the panel 3, stops 30 which limit the pivoting of the pivot body 13 are provided as part of the receptacle 14. A region 31 for leading-through cables is provided between the stops 30, and in this case the region 31 has a surface area of more than five times the cross-sectional area of the cable connection 16.

A plurality of springs 15, which serve to return the pivot body 13 to the illustrated stationary state, are provided distributed over the circumference. Furthermore, the springs 15, on account of their maximum extent, limit the rotation of the pivot body about the insertion axis 12.

Figure 4:
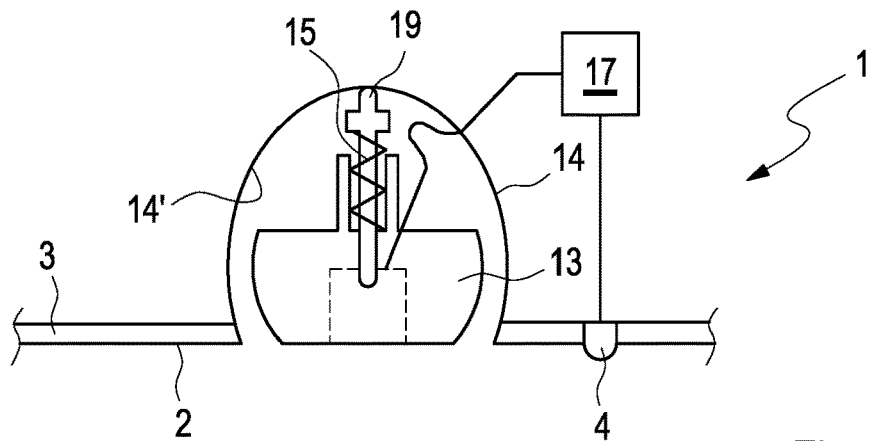
FIG. 4 shows a schematic illustration of a fourth exemplary embodiment of a passenger service module according to the invention having a plug-in connection box according to the invention.

FIG. 4 illustrates a fourth exemplary embodiment of a passenger service module 1 according to the invention, which is based on the exemplary embodiment according to FIGS. 2a, b, wherein the return apparatus of the pivot body 13 is configured differently, however.

In the exemplary embodiment according to FIG. 4, the pin 19 is pushed against the sliding surface 14' of the receptacle 14 by a spring 15, instead of the two magnets 15' (cf. FIGS. 2a, b). Since the sliding surface 14' is an ellipsoid of revolution, the pivot body 13, on account of the spring-pretensioned pin 19, is forced to the stationary state illustrated in FIG. 4.

Figure 5:
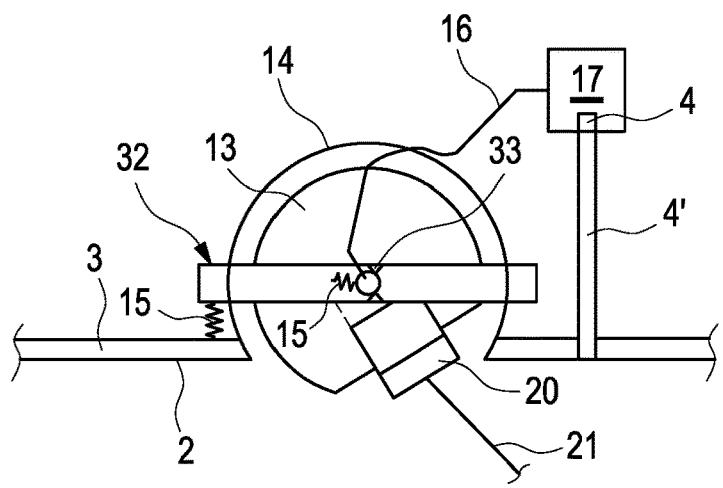
FIG. 5 shows a schematic illustration of a fifth exemplary embodiment of a passenger service module according to the invention having a plug-in connection box according to the invention.

FIG. 5 shows a further exemplary embodiment of a passenger service module 1 according to the invention based on FIGS. 1a-d. However, unlike in FIGS. 1a-d, the pivot body 13 is not mounted in the receptacle 14 in a sliding manner here, but rather is mounted via a cardanic suspension 32. The cardanic suspension 32 allows free pivoting of the pivot body 13 in all directions, wherein, in addition to springs 15 for return to a stationary state, stops 33 for limiting the pivot angle can also be provided as part of the cardanic suspension 32. The electronics module 17 has a control lamp 4, the light of which is guided via a light guide 4', which is detachable from the electronics module 17, to the panel 3, such that a situation of the control lamp 4 lighting up can be sensed from the access side 2. The control lamp 4 can be used to indicate, at the free end of the light guide 4', whether an electronic device which is connected via the socket 11 is being charged and/or whether there is a data connection.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A plug-in connection box for vehicles, the pug-in connection box comprising:
   a socket, which is accessible from an access side and has an insertion direction, the socket being arranged in a pivot body, which is mounted in a movable manner in relation to a receptacle in such a way that the insertion direction of the socket is pivotable at an angle in all directions starting from a stationary state of the pivot body;
   a return apparatus configured to return the pivot body to the stationary state; and
   a release device configured to release a plug which is insertable into the socket when the pivot body is not in the stationary state, the release device being provided on the pivot body.

2. The plug-in connection box as claimed in claim 1, wherein the release device comprises a pin, which extends from the socket as far as the receptacle parallel to the insertion direction, and
   wherein the receptacle is configured such that the pin, which is configured to side along the receptacle, is displaced in a direction of the socket when the pivot body is not in the stationary state, in order to in this way release the plug inserted into the socket.

3. The plug-in connection box as claimed in claim 1, wherein the pivot body is mounted such that it is rotatable about the insertion direction.

4. The plug-in connection box as claimed in claim 1, wherein the return apparatus comprises springs or magnets.

5. The plug-in connection box as claimed in claim 1, comprising a control lamp configured to indicate the correct plug-in connection of a plug into the socket.

6. The plug-in connection box as claimed in claim 1, wherein the socket is a USB socket.

7. A passenger service module for arrangement in the interior of vehicles, the passenger service module comprising:
   a panel which forms the access side and comprises at least one plug-in connection box according to claim 1 incorporated therein.

8. The passenger service module as claimed in claim 7, wherein the passenger service module is of a modular construction and, in addition to the panel with at least one incorporated plug-in connection box, comprises an electronics module which is embodied separately from the panel and is connected to the socket of the at least one plug-in connection box via a detachable cable connection.

9. The passenger service module as claimed in claim 7, comprising a plurality of plug-in connection boxes, comprising the plug-in connection box, which correspond to a plurality of passenger spaces associated with the passenger service module.

* * * * *